United States Patent [19]

Thorson et al.

[11] Patent Number: 5,360,623

[45] Date of Patent: Nov. 1, 1994

[54] METHOD OF PREPARING A DRY MIX USEFUL IN PREPARING BAKED GOODS

[75] Inventors: James S. Thorson, Scandia; Jimmy A. DeMars, Hugo, both of Minn.

[73] Assignee: The Pillsbury Company, Minneapolis, Minn.

[21] Appl. No.: 905,464

[22] Filed: Jun. 29, 1992

[51] Int. Cl.⁵ .......................... A21D 10/00; A23L 1/10
[52] U.S. Cl. ..................................... 426/555; 426/554; 426/549; 426/622
[58] Field of Search ................. 426/554, 555, 549, 622

[56] References Cited

U.S. PATENT DOCUMENTS

| | | | |
|---|---|---|---|
| 3,508,928 | 4/1970 | Ewing et al. | 426/555 |
| 3,508,929 | 4/1970 | Callaghan et al. | 426/555 |
| 3,551,166 | 12/1970 | Baum et al. | 426/555 |
| 3,694,230 | 9/1972 | Cooke | 426/555 |
| 4,865,863 | 9/1989 | Prosise et al. | 426/555 |

*Primary Examiner*—Donald E. Czaja
*Assistant Examiner*—Mary S. Mims
*Attorney, Agent, or Firm*—Fredrikson & Bryson

[57] ABSTRACT

In a first embodiment, the present invention provides an improved finishing process for dry mixes for baked goods of widely varying compositions. According to this embodiment, a standard cake finisher is replaced with a disc mill, which yields surprisingly superior dry mix properties. In another embodiment of the invention having particular utility in dry mixes for brownies and the like, a dry, particulate pre-mix is formed by mixing the shortening with a selected portion of the dry ingredients of the dry mix. It is preferred that no more than approximately 25% of the total flour content of the dry mix be added in this pre-mix. This pre-mix is then mixed with the rest of the ingredients of the dry mix and this final dry mix may subjected to a finishing operation such as that of the first embodiment of the invention.

11 Claims, 2 Drawing Sheets

METHOD OF PREPARING A DRY MIX USEFUL IN PREPARING BAKED GOODS

BACKGROUND OF THE INVENTION

The present invention relates to a dry mix useful in preparing baked goods. Such dry mixes are commonly sold commercially to consumers and such consumers add certain additional ingredients, such as water, eggs or the like, to make a batter. The batter may then be baked to produce the final baked goods. Such baked goods commonly include brownies, cakes or similar products.

Dry mixes for baked goods generally include sugar, flour, shortening and a variety of other constituents which depend upon the final desired baked good. For instance, if the dry mix is intended for use in preparing brownies, it may additionally include ingredients such as cocoa, salt, and vanilla. Current commercial processes for producing a suitable dry mix are exemplified in U.S. Pat. No. 3,439,878 (Ganske), the teachings of which are incorporated herein by reference.

Generally speaking, all of the "dry" ingredients, i.e., all of the ingredients except the shortening, are charged into a mixing apparatus and mixed together. The shortening is then added and mixed with the rest of the ingredients. As explained in Ganske's '878 patent, this desirably may be accomplished by fluidizing the dry ingredients by entraining the dry, powdered substances in air. When the dry ingredients have been fluidized, shortening may be added to this mixture as a fluid by spraying through a nozzle. This atomized shortening then mixes with the rest of the ingredients to form the final dry mix.

Dry mixes manufactured according to commercially establish processes, though, often contain lumps, or "pills", of aggregated flour and shortening. In order to remove these pills, commercially produced dry mixes are commonly subjected to a further "finishing" stage of processing prior to packaging for commercial sale. In this finishing process, the mixed ingredients are passed through a device, appropriately referred to as a "finisher", which is designed to grind the product and break up the pills. Nonetheless, in current commercial processes pills continue to pass through the finisher and end up in the final products sold to consumers. These pills tend to be rather noticeable in the finished baked good made by the consumer, often appearing as lumps of uncooked flour within the product or as loose flour on top of the product.

Additionally, current mixing processes for producing brownie dry mix currently yield only a relatively small amount of "flake" on top of the final, baked brownies. The term "flake" as used herein refers to a thin, flaky skin which forms on the upper surface of baked brownies. A high degree of flake is generally considered to be desirable in brownies because it provides the brownies with an attractive appearance commonly associated with high quality brownies.

Thus, it would be desirable to provide a finishing process which can more effectively reduce pills present in commercially manufactured dry mixes. Additionally, it would be desirable to provide an improved process for manufacturing a brownie dry mix which would enhance flaking in the final, baked brownie product.

SUMMARY OF THE INVENTION

In a first embodiment, the present invention relates to an improved finishing process which may be employed with virtually any dry mix used in producing baked goods. According to this invention, the standard finisher is replaced with a disc mill. Disc mills comprise two spaced-apart discs which rotate relative to one another, and product passing through the disc mill is ground between the two discs. It has been found that disc mills, which heretofore have not been used in the commercial production of dry mixes, produce a final dry mix product which is virtually free of pills, representing a significant improvement over dry mixes finished by conventional processes. Also, the use of a disc mill in the finishing step may more intimately mix the ingredients of the dry mix during the grinding operation which can also enhance the final dry mix product.

In another embodiment of the invention having particular utility in producing brownie dry mix products, a dry, particulate pre-mix is formed by mixing the shortening with selected dry ingredients at an elevated temperature. Although the dry ingredients mixed with the shortening at this stage can be varied fairly widely, the best flavor and texture in the final baked goods is obtained when no more than approximately 25% of the total flour content of the dry mix be added in this pre-mix. This pre-mix is then mixed with the balance of the dry ingredients in a conventional manner to produce the complete dry mix product. The resulting dry mix is desirably subjected to a finishing operation, such as the disc mill finishing operation outlined above.

DETAILED DESCRIPTION OF THE PREFERRED EMBODIMENTS

Figure 1:
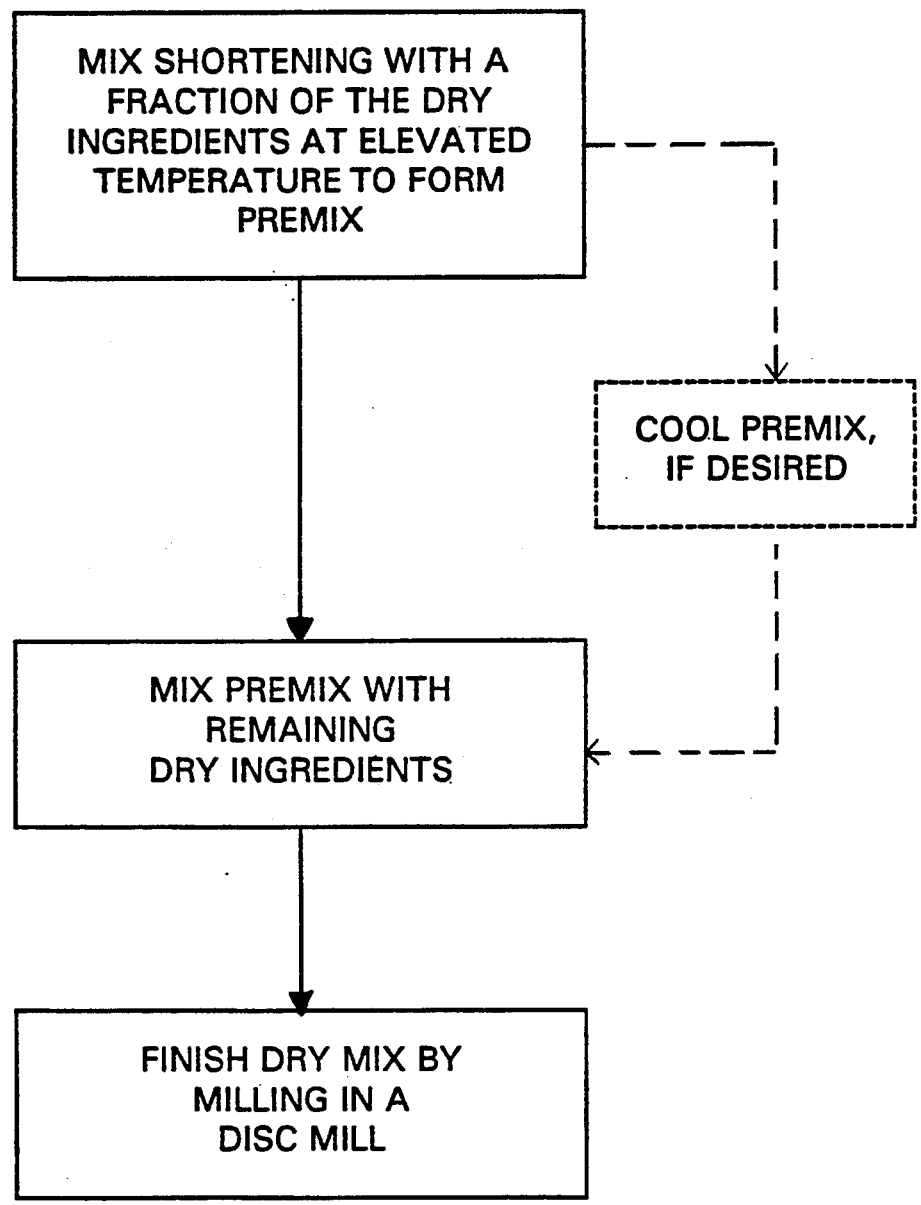
FIG. 1 is a schematic flow diagram of a process for making a dry mix according to the present invention.

A first embodiment of the present invention utilizes a disc mill in processing a dry mix for baked goods. The particular composition of the dry mix may be varied as desired to produce a mix suitable for any specific type of baked good. As used herein, the term "dry mix" is considered to comprise a mixture which includes flour, sugar and shortening which is in a relatively dry, flowable form and is adapted to be mixed with one or more additional ingredients for baking to produce an edible baked good. The relative proportions of these three ingredients may be adjusted as desired and the mix may include any other ingredients necessary for the particular desired baked good, such as salt, cocoa or the like. Obviously, recipes for a wide variety of baked goods are well known in the art and need not be set forth in detail here.

One key characteristic of these dry mixes is that they all include shortening. Although shortening may be derived from any of numerous different sources, such as vegetable or animal fats, all shortening is essentially a source of fat for the final baked product. Shortening therefore has characteristics commonly associated with fats, such as being relatively plastic.

Most other ingredients of dry mixes are relatively friable. For instance, both sugar and flour are routinely ground into their powdered form by impact, abrasion or other similar means of attrition. Due to its plastic nature, though, shortening generally cannot be ground by such methods. If pure shortening were to be passed though a milling machine or the like adapted for use with relatively friable materials such as flour, the shortening would not experience a reduction in particle size. Instead, it would plastically deform and may well clog the milling machine by coating it surfaces and ceasing to flow through the device.

Because dry mixes include shortening, they tend to be more difficult to mill than their more friable components milled in the absence of shortening. The shortening in a dry mix tends to lend plasticity to the dry mix to an extent generally proportional to the relative amount of shortening in the mixture—the more shortening in a mixture, the more plastic the behavior of the dry mix. At the levels commonly utilized in dry mixes for baked goods, shortening tends to significantly affect the rheology and friability of the powdered mixes.

For this reason, many of the methods commonly used for reducing the particle size of powdered products have proven to be only marginally effective for dry mixes. Current industry practice in the commercial production of dry mixes involve the use of a "cake finisher" to reduce the particle size of dry mixes before packaging the mixes for sale. As noted above, this is done primarily to reduce the presence of pills in the product and their deleterious effects on baked goods made with the mixes.

Cake finishers generally utilize paddles or blades which spin rapidly within an enclosure. The dry mix is attrited by impact against the paddles as well as by particle-to-particle impact. In order to effectively grind the mix, the cake finisher must essentially fluidize the powdered mix and create turbulence within the enclosure.

A variety of other grinding techniques have been attempted with dry mixes, but have proven to yield unacceptable results. For instance, dry mixes have been passed through roller mills, which are commonly used in processing more friable powders. Roller mills generally comprise a pair of parallel rollers positioned a fixed distance apart from one another. Powder is passed between these rollers as they are turned and the rollers crush the powder to break down the oversized particles.

Although roller mills are effective for dry mixes having very low shortening content, they can be problematic when used .with dry mixes having higher shortening contents. Such high-fat content products tends to be plastically deformed into numerous flakes when passed between the rollers. These flakes essentially comprise thin, flat aggregates of flour and shortening. Although the baked goods produced with such flaky mixes may be superior to those produced with raw, unmilled mixes, the dry mix itself has a generally undesirable mottled appearance. The consumer purchasing the mix would see an uneven, flaky powder which does not appear to be well mixed.

Even traditional cake finishers cannot effectively process dry mixes having relatively high shortening content. At lower shortening contents, dry mix particles will tend to break when they strike the finisher's paddles or each other. When the shortening content is increased, though, the particles will tend to stick to one another upon impact rather than break each other down into smaller parts. The resulting finished dry mix has rather large, sticky aggregates mixed in with the rest of the powder; in a somewhat extreme case of a dry mix for brownies, these aggregates have been described as "tootsie rolls".

Disc mills are commonly used in processing dry, friable powders as well as slurries including such particles. Disc mills employ a pair of axially aligned, spaced-apart discs which spin relative to one another and product is introduced at the center of the discs, i.e., along the mill's axis. As the discs spin relatively rapidly with respect to one another, the product is urged generally radially outwardly by centrifugal forces and the ground product is collected about the periphery of the discs. The spacing between the two discs' respective faces commonly may be controlled to control the resulting particle size of powders passed therebetween, with any particles larger than the space between the discs being Found between the discs' faces.

The discs used in disc mills tend to have contoured, as opposed to smooth, faces to increase grinding efficiency. The pattern of the contours on the faces of the discs are carefully chosen to effectively grind the particles between the spinning discs as well as to efficiently direct the product toward the periphery of the mill. A plate pattern which is ideally suited for one powder may not be particularly effective for another type of powdered material.

It is generally understood in the art that disc mills can be used to process only free-flowing, friable powders. Even in the case of slurries, it is commonly accepted that the powders entrained in the fluid must be friable so that they are susceptible to being broken by the Finding action of the opposed disc faces. Thus, one familiar with disc mills and their operation would assume that disc mills could not be used to process dry mixes due to the relatively plasticity of such materials.

In particular, one would be led to conclude that the shortening would cause the disc mill to clog. In light of the fact that dry mixes tend to coat the rollers of a roller mill, it would be logical to conclude that the product would coat the grinding faces of the discs of a disc mill. Whereas this may not be terribly critical in the case of roller mills due to the relatively smooth surfaces of the rollers used, this would be more problematic in the case of a disc mill having disc faces which are carefully contoured to promote grinding.

As noted above, the contouring of the disc faces is also intended to ensure that product will flow efficiently from the axis of the mill where it is introduced to the discs' periphery where it is removed. Hence, the coating of the disc faces by the plastic shortening would be expected to substantially impede, if not completely block, the flow of a dry mix through such a mill. Finally, even if a dry mix were somehow capable of being passed through a disc mill one would expect the resulting product to have a flaky, mottled appearance such as that associated with the use of a roller mill.

Quite unexpectedly, though, it has been found that disc mills can be utilized advantageously in processing dry mixes. Contrary to what one of ordinary skill in the art would be led to conclude, dry mixes not only do not clog the mills, but they actually can achieve similar throughputs using less horsepower in a mill about one half to one quarter the size of the cake finisher, saving valuable floor space in the production facility. Standard cake finishers also tend to produce a lot of "dust" and commonly require the use of a cyclone or the like to collect dry mix entrained in the exhaust of the finishing chamber. Such additional equipment is not necessary in the present invention because the disc mill does not require fluidization of the dry mix.

Furthermore, it has been demonstrated that dry mixes milled with this type of mill actually exhibit superior rheological properties and are virtually free of all pills. As a matter of fact, disc mills have proven capable of producing a high-quality dry mix at shortening levels which have led to extremely flaky powders in roller mills and to mixes with "tootsie roll" aggregates in cake finishers. Perhaps most surprisingly, brownie dry mixes which are finished in a disc mill yield brownies which have significantly more "flake" than a dry mix of exactly the same composition passed through a standard cake finisher.

EXAMPLE I

In order to test the efficacy of the disc mill as compared to that of a standard cake finisher, a standard brownie dry mix was produced by a standard commercial dry mix process. In particular, the following "dry" ingredients were added to a ribbon blender and mixed together: 3308.8 pounds (55 wt. %)of sugar, 1858.4 pounds (31 wt. %) of flour, and 352.7 pounds (5.9 wt. %) of additional flavoring ingredients, which included cocoa, salt, vanilla, and bicarbonate of soda. The batch was cooled with about 14 pounds of liquid carbon dioxide during blending to a temperature of 35°–40° F.; such use of liquid $CO_2$ is a method known in the art for reducing the temperature of a dry mix. Over a period of about 6 minutes, about 480 pounds (8 wt. %) of melted, liquid shortening was added to the dry ingredients by atomization similar to that described by Ganske in U.S. Pat. No. 3,439,878, referred to above. This mix was then mixed an additional 3 minutes and passed into a hopper.

Two samples of this resulting dry mix were passed through a Turbolizer TM, a standard cake finisher manufactured by the Strong-Scott company of Minneapolis, Minn., at a rate of about 6,000 pounds per hour. Two separate samples were passed through a disc mill having discs about one foot in diameter, sold by Andritz Sprout-Bauer as a "Lab Disc Mill: 12 inch". One sample was milled at a feed rate of about 6,000 pounds per hour and a second ample was milled at a feed rate of about 12,000 pounds per hour.

Five separate batches of brownies were then made with these dry mixes. One batch of brownies was prepared from a ample of the unmilled dry mix, one from each of the two samples passed through the standard cake finisher, and one batch was prepared with each of the two different disc milled samples.

Each of these batches were made by mixing about 21.5 ounces of the dry mix with about one-half of a cup of water, about the same quantity of vegetable oil and one egg. These ingredients were mixed thoroughly and placed into a greased 9"×13" pan and baked in the pan at about 350° F., for about 33–35 minutes. The baked brownies were then allowed to cool.

The "flake value" of each of these batches of brownies was determined by visually inspecting the brownies and assigning a "flake value" for the brownies on a scale of one to ten, with a flake value of one signifying very little flake and a figure of ten signifying a great deal of flake on the top of the brownies. A flake value on this scale of at least about six and up to about eight is considered optimal. The brownies produced with the unmilled dry mix were determined to have a flake value of approximately 4.0. The two batches prepared with the separate cake finisher samples were assessed as having flake values of about 4.3 and about 5.3, for an average of about 4.8. However, the sample passed through the disc mill at a feed rate of 6,000 pounds per hour had a flake value of about 7.0 while the sample passed through the disc mill at a feed rate of 12,000 pounds per hour had a flake value of about 8.7.

Additionally, visual inspection of the milled dry mixes determined that the product milled with a disc mill achieved a somewhat more uniform appearance than that of the product milled in the cake finisher. This uniformity indicates that the disc mill achieved superior mixing of the ingredients of the dry mill. Furthermore, the average pill content of a dry mix finished in a standard cake finisher, as measured by the weight percent of the mix which failed to be passed through a U.S. standard #12 sieve using a soft brush, is about 8.9 wt. % of the total dry mix. Disc milled samples, though, had only about 0–3 wt. % of the dry mix fail to pass through the sieve.

Thus, the dry mix which was passed through the disc mill not only did not clog the disc mill, as one familiar with dry mixes may have been lead to conclude, but also was able to be passed through the disc mill at a feed rate nearly twice that of the standard cake finisher. Furthermore, the dry mix processed with the disc mill was superior in all respects to that processed with the standard cake finisher. Finally, the batches of brownies prepared with the dry mix processed with the disc mill had a markedly greater flake value than those samples processed with the standard cake finisher. As a matter of fact, the results obtained with the standard cake finisher were only slightly better than those achieved with dry mix which had not been milled at all—a flake value of about 4.8 versus about 4.0. The dry mix processed with a disc mill, though, had significantly higher flake values at both feed rates, with the dry mix passed through the disc mill at about 12,000 pounds per hour having slightly higher flake values than the sample processed at 6,000 pounds per hour.

Although the present example relates to the processing of brownie dry mix with a disc mill, it is believed that similarly significant improvements in the dry mix and the resulting product can be achieved regardless of the nature of the dry mix. This expectation is particularly true in the case of dry mixes which have significantly higher shortening content because, as noted above, the disc mill has proven capable of processing high-shortening dry mixes much more effectively than either the standard cake finisher or roller mills.

Figure 2:
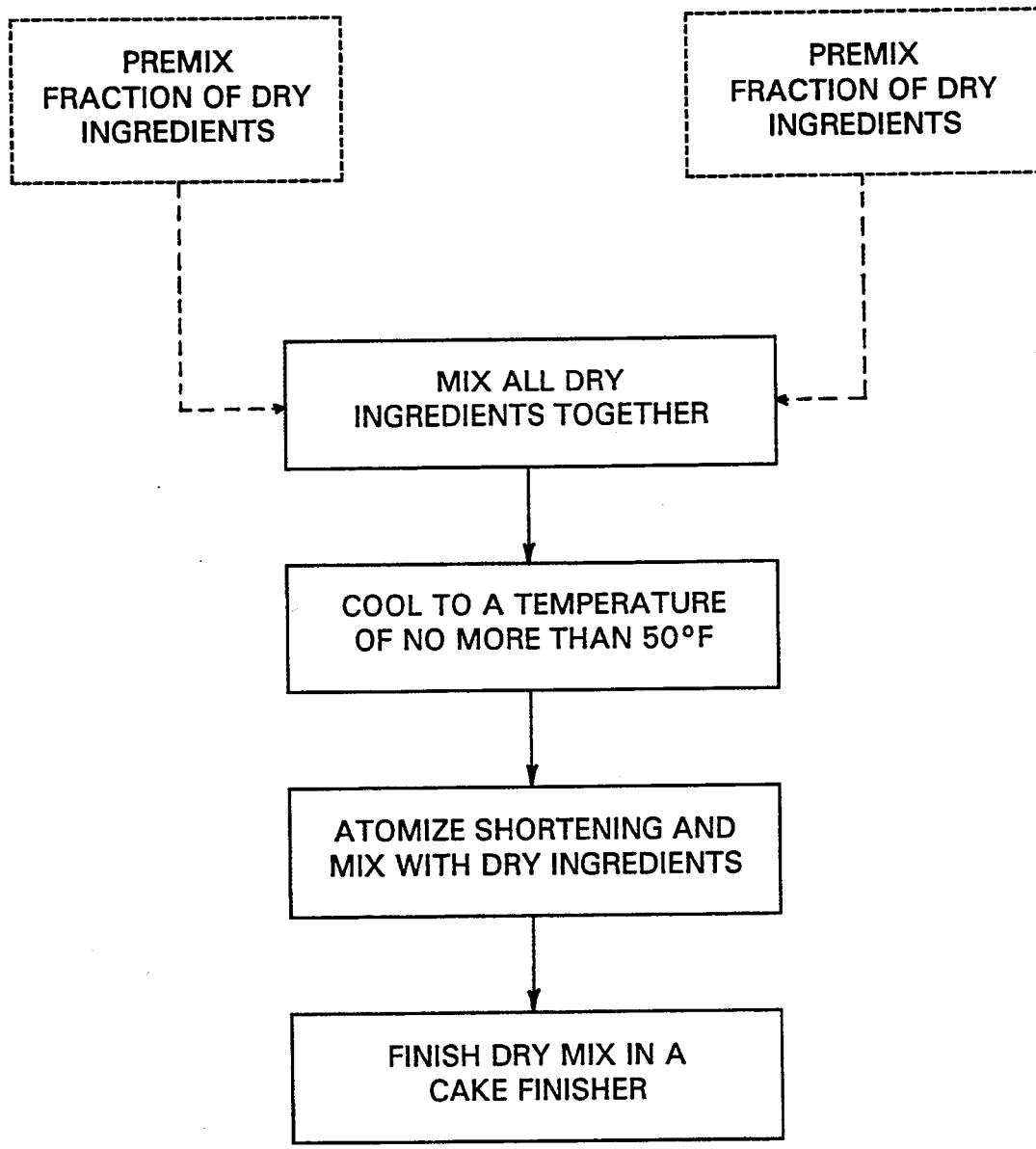
FIG. 2 is a schematic flow diagram of a process for making a dry mix according to present commercial standards.

A second embodiment of the present invention relates to a method for preparing a dry mix which is particularly suited for use with brownies. As noted above and shown in FIG. 2, current commercial processes for preparing a dry mix for use with brownies is accomplished by mixing together all the dry ingredients for the brownies, such as in a ribbon blender, prior to adding shortening to the mix. As indicated in FIG. 2, in some instances portions of the dry ingredients may be mixed together to form a dry, shortening-free "premix" that is subsequently blended with the rest of the dry ingredients. Before the shortening is added, the dry ingredients are commonly cooled down to a temperature below 50° F., such as about 35°–40° F.

Although there has been limited understanding of this phenomenon in the past, it has been noted that the consistency of product produced by a method wherein the shortening is added to the dry ingredients at a high temperature, e.g. above 50° F., is quite poor. Whereas one batch prepared at such a temperature may yield a dry mix which is nearly acceptable, the very next batch may yield a totally undesirable dry mix. Additionally, there tends to be significant quality variability even within a single batch of dry mix.

In the course of the present investigation, it has been found that the temperature of the dry mix to which the shortening is added significantly affects the mechanism by which the shortening intermingles and mixes with the other ingredients. Shortening is commonly added to these dry ingredients in liquid form, such as by atomization into a fluidized dispersal of the dry ingredients, as indicated in FIG. 2. Shortening is not a single chemical compound, but tends to be a mixture of fat molecules having different molecular weights. Accordingly, shortening tends to have a melting range, rather than a single melting point, with the shortening beginning to melt at the lower end of the range and being completely melted only at the upper end of the range. Accordingly, shortening must generally be heated to a temperature at or above the upper end of this melting range to ensure that it is in its liquid form for atomization. For the types of shortening commonly used in brownie dry mixes, e.g. a hydrogenated vegetable shortening without added emulsifiers and with an SFI of about ten or less at 100° F., the melting range is about 70°–100° F.

When shortening is added to dry ingredients which are at a temperature less than about 50° F., the atomized shortening droplets tend to solidify almost instantly. This essentially produces a series of small, solid shortening particles which are then mixed with the rest of the dry ingredients. Since the shortening has a high fat content, the additional ingredients tend to stick to the exterior of these shortening particles, essentially forming a coating on each and every shortening particle.

At temperatures above about 50° F., the shortening does not cool quickly enough for the small, atomized shortening particles to produced a series of relatively discrete aggregates of shortening coated with the other ingredients. Instead, some of the shortening particles will remain in a relatively liquid form and will actually coat the other dry ingredients instead of being coated by those ingredients. These particles of dry ingredients coated with shortening will then have a tendency to stick to other particles of shortening which have been coated with the dry ingredients, resulting in a rather inconsistent product with overly large agglomerates. Further, since the shortening has a melting range rather than a melting point, the precise temperature at which a particular droplet of shortening will solidify sufficiently to be coated by the dry ingredients rather than coat the dry ingredients themselves, is highly unpredictable. Both these factors tend to reduce the consistency of a dry mix produced by this method, at temperatures above about 50° F., both within a single batch of dry mix and from one batch to the next.

It has been found, however, that this problem can be solved by actually increasing the temperature at which the dry ingredients are maintained prior to the addition of the shortening. In particular, it is preferred that the temperature of the dry ingredients be at least about 70° F. This will prevent the shortening from solidifying too quickly. Instead of atomizing the liquid shortening to produce a series of small droplets which solidify almost immediately upon contact with the remaining dry mix ingredients, the shortening remains in its liquid form for a relatively long period of time. Whereas the cold process outlined above produces a dry mix wherein the dry ingredients coat small shortening particles, mixing the shortening into dry ingredients which are at a high temperature permits the shortening to form a thin coating on each of the particles of the other ingredients of the dry mix. It is preferred that the dry ingredients are maintained at a temperature above at least the bottom end of the melting range for the shortening, and desirably above the top end of the shortening's melting range. A temperature of about 115° F. is preferred for common cake shortening, which has a melting range of about 70°–100° F., as noted above.

As outlined above and in FIG. 2, in current commercial processing all of the dry ingredients of the dry mix are mixed together and then charged into a mixer for the addition of shortening. According to the present invention, though, it is preferred that the shortening be added to only a portion of the remaining ingredients of the dry mix to form an initial pre-mix. As shown in FIG. 1, this pre-mix is then mixed with the balance of the dry mix in a separate mixing operation.

It has been found that if more than about 25% of the flour content of the final dry mix product is included in this pre-mix, the dry mix will tend to have inferior properties. (It should that this 25% figure was determined with a brownie dry mix; the precise percentage may vary from one type off dry mix to another.) As explained above, in the process of the present invention, the shortening is believed to substantially coat most or all of the particulate ingredients to which it is added. Accordingly, any flour which is incorporated into this pre-mix would have a coating of shortening about the majority of its exterior surface. It is believed that this coating will prevent the flour particles of the pre-mix from interacting to build the necessary structure for a bread-like baked good such as brownies.

Thus, if one were to include all of the flour of the dry mix in the pre-mix, virtually all of the flour particles would have a coating of shortening. This would result in a final baked brownie product which is quite heavy and tends to "grease out." As understood by those in the trade, the term "grease out" refers to the condition wherein the final baked product has a greasy texture or appearance due to the presence of free, unincorporated shortening. Although in the case of brownie dry mixes it is desirable to have a relatively low-volume final product as compared to bread or the like, "grease out" is not desirable for brownies because it tends to coat the consumer's mouth with shortening and yield a relatively greasy taste.

Hence, it is preferred that the weight percentage of the total flour content of the dry mix composition utilized in forming the pre-mix be between 0% and about 25%, leaving the remaining 75–100% of the flour generally uncoated with shortening. At lower flour ranges, the pre-mix desirably includes additional ingredients, such as sugar. If 0% of the flour needs of the dry mix are used, i.e., if the pre-mix includes no flour, the shortening may be mixed with sugar and/or any of the flavoring ingredients used in the dry mix.

Since the shortening does not solidify quickly upon contact with the dry ingredients, there is no need in the process of the present invention to atomize the shortening. Instead, one may simply add the shortening in bulk, such as through a pipe which enters a mixing chamber containing the balance of the ingredients of the pre-mix. The shortening remains predominantly in fluid form after it contacts the dry mix and therefore can manage to coat each of the particles of the pre-mix prior to solidifying. This results in a rather uniform distribution throughout the pre-mix.

If one were to add the shortening in bulk to dry-mix ingredients maintained at a temperature below 50° F., the shortening would solidify upon contact and produce rather large, fatty agglomerates with a coating of the dry ingredients on the exterior of each of these agglomerates. This is clearly an undesirable attribute of a dry-mix, so it is considered necessary to atomize the shortening when adding it to powered ingredients at a temperature below about 50° F.

As noted above, the shortening of the present pre-mix tends to coat the particles to which is added. At room temperature, this produces a somewhat sticky product having a consistency not unlike that of brown sugar—it tends to stick together somewhat and can be relatively difficult to handle in bulk. Since this could be an impediment in commercial production of dry mixes, the pre-mix may be cooled below about 50° F., and desirably to about 35°–40° F., prior to being mixed with the balance of the ingredients of the dry mix to make handling easier. This is shown in phantom lines in FIG. 1 to indicate that this cooling step is optional; one could skip the cooling step and simply mix the premix with the remaining dry ingredients, as indicated by the solid lines in FIG. 1. As known in the art, this may be achieved by adding liquid carbon dioxide to the pre-mix; this is the current commercial method by which the dry ingredients are cooled below 50° F. prior to addition of the shortening. Although the pre-mix is a dry, particulate powder prior to cooling, cooling product down below 50° F., and desirably to a temperature between 35° F. and 40° F., permits the pre-mix to flow more readily and therefore simplifies handling in commercial processes.

The pre-mix may be added to the balance of the ingredients of the dry mix at any desired time. If so desired, the pre-mix may be stored for an extended period of time prior to be added to the rest of the dry mix ingredients. If the pre-mix is so stored, it may be stored at about room temperature, but is desirably cooled below about 50° F. prior to being mixed with the rest of the ingredients to ensure that is free-flowing and will mix thoroughly with the other ingredients, as noted above. This mixing can be accomplished in any desired fashion, such as with a ribbon blender or the like.

Once the pre-mix has been blended thoroughly with the remaining ingredients, the dry mix may be immediately packaged for commercial sale. However, as explained in some detail above, it is desirable to subject a dry mix to a finishing process prior to packaging for final resale. Although a dry mix made in accordance with the present embodiment of the invention may be finished by any known finishing process, it is preferred, for the reasons detailed above, that a disc mill be used to finish the ingredients as shown in FIG. 1.

EXAMPLE II

A brownie dry mix was made in accordance with the process of the present embodiment and finished with a disc mill. The resulting dry mix was then utilized to make brownies and these brownies were compared with those made in accordance with existing manufacturing practice.

First, 2481.6 pounds of sugar and 464.6 pounds of flour were added to a ribbon blender and mixed. As is well known, this mixing process will tend to produce heat. The mixing was continued until the flour and sugar reached a temperature of about 79° F. to about 81° F. 480 pounds of shortening were then added to the sugar and flour in the ribbon blender over a period of about 2–3 minutes. (It should be noted that this time is only one-third to one-half of the 6 minutes required to atomize the shortening in the cold process outlined above in Example I.) This composition was then mixed for an additional two minutes to insure thorough dispersion of the shortening in the mix. The resulting pre-mix was cooled to about 40° F. with liquid carbon dioxide.

The cooled pre-mix was then mixed in a ribbon blender with 827.2 pounds of sugar, 1393.8 pounds of flour and 352.7 pounds of additional flavoring ingredients, which included cocoa, salt, vanilla and bicarbonate of soda. This combination was mixed for an additional three minutes to produce the final dry mix product. By comparison with the process outline above in Example I, it can be seen that the composition of the final dry mix was substantially identical in both of these processes. However, in the present example approximately 75% of the sugar requirements of the final dry mix and about 25% of the flour requirements of the final dry mix were utilized in forming the pre-mix.

The resulting dry mix was then processed in a disc mill as outlined above. It should be noted that the plate spacing between the discs of the disc mill in both Example I and the present Example was approximately 0.060".) A first sample of this dry mix product was passed through the disc mill at feed rate of about 6,000 pounds per hour, while the second sample was passed through at a feed rate of about 12,000 pounds per hour.

A batch of brownies was prepared with a sample taken from this dry mix prior to the finishing process and each of the disc milled samples were also used to form a batch of brownies. These brownies were formed by substantially the same procedure as that outlined above in Example I. The flake value for the brownies made with the unmilled pre-mix was about 2.0 while the brownies formed of the 6,000 pound-per-hour disc mill sample had a flake value of about 6.0 and the 12,000 pound-per-hour disc mill sample yielded brownies with a flake value of about 6.3. As can be seen by comparison with the results obtained with the disc milled product in Example I, the flake values for brownies formed according to the present invention were slightly less than those obtained with the process of Example I. However, the volume of the brownies was approximately the same for both the cold-process dry mix (Example I) and the warm-process dry mix (the present Example).

Thus, the quality of the final baked good made with a dry mix produced in accordance with the warm process of the present invention were comparable with those obtained with the cold process outlined above. However, as explained above, shortening may be added to the pre-mix of the present invention in bulk, without requiring the atomization necessary in the cold process of Example I. Not only does this decrease the equipment costs by eliminating the atomizing equipment, but the addition of the shortening can take place in a much shorter time frame than that achievable when atomizing the shortening. This in turn reduces the total manufacturing time for a batch of the dry mix, increasing the efficiency of a manufacturing facility.

While a preferred embodiment of the present invention has been described, it should be understood that various changes, adaptations and modifications may be made therein without departing from the spirit of the invention and the scope of the appended claims.

What is claimed is:

1. A method of preparing a dry mix including sugar, flour and shortening for producing baked goods comprising the steps of:
   a) mixing sugar, liquid shortening and between about 0% and about 25% of said flour at a temperature of at least about 70° F. to produce a dry, particulate pre-mix and
   b) mixing said pre-mix with sugar and flour to yield a flowable dry mix for said baked goods.

2. The method of claim 1 further comprising the step of finishing said dry mix by grinding said dry mix in a disc mill.

3. The method of claim 1 wherein the shortening is added to the flour in bulk to form said pre-mix.

4. The method of preparing a dry mix including sugar, flour and shortening comprising the steps of
   a) mixing said shortening and no more than about 25% of said flour at a temperature of at least about 70 degrees F. to form a dry, particulate pre-mix; and
   b) mixing said pre-mix with sugar and the remaining portion of the flour to form said dry mix.

5. The method of claim 4 wherein sugar is mixed with said flour and shortening in forming said pre-mix.

6. The method of claim 4 wherein the pre-mix is cooled prior to mixing to form the dry mix.

7. The method of claim 6 wherein the shortening and flour are cooled to a temperature of no more than about 50° F.

8. The method of claim 4 wherein the shortening is added to the flour in bulk to form said pre-mix.

9. The method of claim 4 further comprising the step of finishing said dry mix by grinding said dry mix in a disc mill.

10. A method of preparing a dry mix including sugar, flour and shortening comprising the steps of mixing said sugar, flour and shortening to produce a dry mix, and grinding said dry mix between the discs of a disc mill.

11. A method of preparing a dry mix including sugar, flour and shortening comprising the steps of:
   a) mixing said shortening, a portion of said sugar, and between about 0% and about 25% of said flour at a temperature of at least about 70° F. to form a dry, particulate pre-mix;
   b) cooling said pre-mix to a temperature of no more than about 50° F.;
   c) mixing said pre-mix with sugar and the remaining portion of the flour to form said dry mix; and
   d) finishing said dry mix by grinding in a disc mill.

* * * * *